United States Patent [19]

McCurdy

[11] Patent Number: 4,814,684
[45] Date of Patent: Mar. 21, 1989

[54] APPARATUS FOR EXTENDING THE VOUT/VIN RATIO OF A DC-TO-DC CONVERTER

[75] Inventor: Roger A. McCurdy, Troy, Mich.
[73] Assignee: TRW Inc., Lyndhurst, Ohio
[21] Appl. No.: 220,379
[22] Filed: Jul. 11, 1988

Related U.S. Application Data

[63] Continuation of Ser. No. 102,871, Sep. 30, 1987, abandoned.

[51] Int. Cl.$^4$ ............................................. H02M 3/158
[52] U.S. Cl. ...................................... 323/222; 323/288
[58] Field of Search ........................ 323/222, 288, 351; 363/21

[56] References Cited

U.S. PATENT DOCUMENTS

| | | | |
|---|---|---|---|
| 4,160,288 | 7/1979 | Stuart et al. | 363/41 |
| 4,180,852 | 12/1979 | Koizumi et al. | 363/21 |
| 4,355,277 | 10/1982 | Davis et al. | 323/351 |
| 4,536,700 | 8/1985 | Bello et al. | 323/222 |
| 4,542,330 | 9/1985 | Terbrack | 323/222 |
| 4,546,421 | 10/1985 | Bello et al. | 363/21 |
| 4,562,522 | 12/1985 | Adams et al. | 363/21 |
| 4,679,131 | 7/1987 | Filliman | 363/21 |

FOREIGN PATENT DOCUMENTS 935910  6/1982  U.S.S.R. ............................... 323/222

OTHER PUBLICATIONS

Motorola Information Note for MC 34063 from Motorola Linear Interface Integrated Circuits Catalog, Copyright 1983.
Motorola Application Note AN920A.

Primary Examiner—William H. Beha, Jr.
Attorney, Agent, or Firm—Tarolli, Sundheim & Covell

[57] ABSTRACT

An apparatus is disclosed for extending the Vout/Vin ratio of a commercially available DC-to-DC converter. The DC-to-DC converter is connected to a first DC voltage, Vin. An inductor is connected to the first DC voltage and to a rectifier which provides the output voltage Vout. A first switching circuit is connected to the junction of the inductor and rectifier and to electrical ground. An oscillator provides a control signal for controlling actuation of the first switching circuit. The output signal from the oscillator has a duty cycle. A timing capacitor is connected to the oscillator and controls the duty cycle of the control signal output to the first switching circuit. A second switching circuit is connected to the output of the inductor/rectifier junction and is connected across the capacitor to provide a second discharge path for the capacitor in response to the first switching device disconnecting the junction of the inductor and rectifier from electrical ground. The second switching circuit rapidly discharges the timing capacitor and thereby extends the ON/(ON+OFF) time of the first switching device which, in turn, extends the Vout/Vin ratio of the converter beyond that specified by the manufacturer.

11 Claims, 1 Drawing Sheet

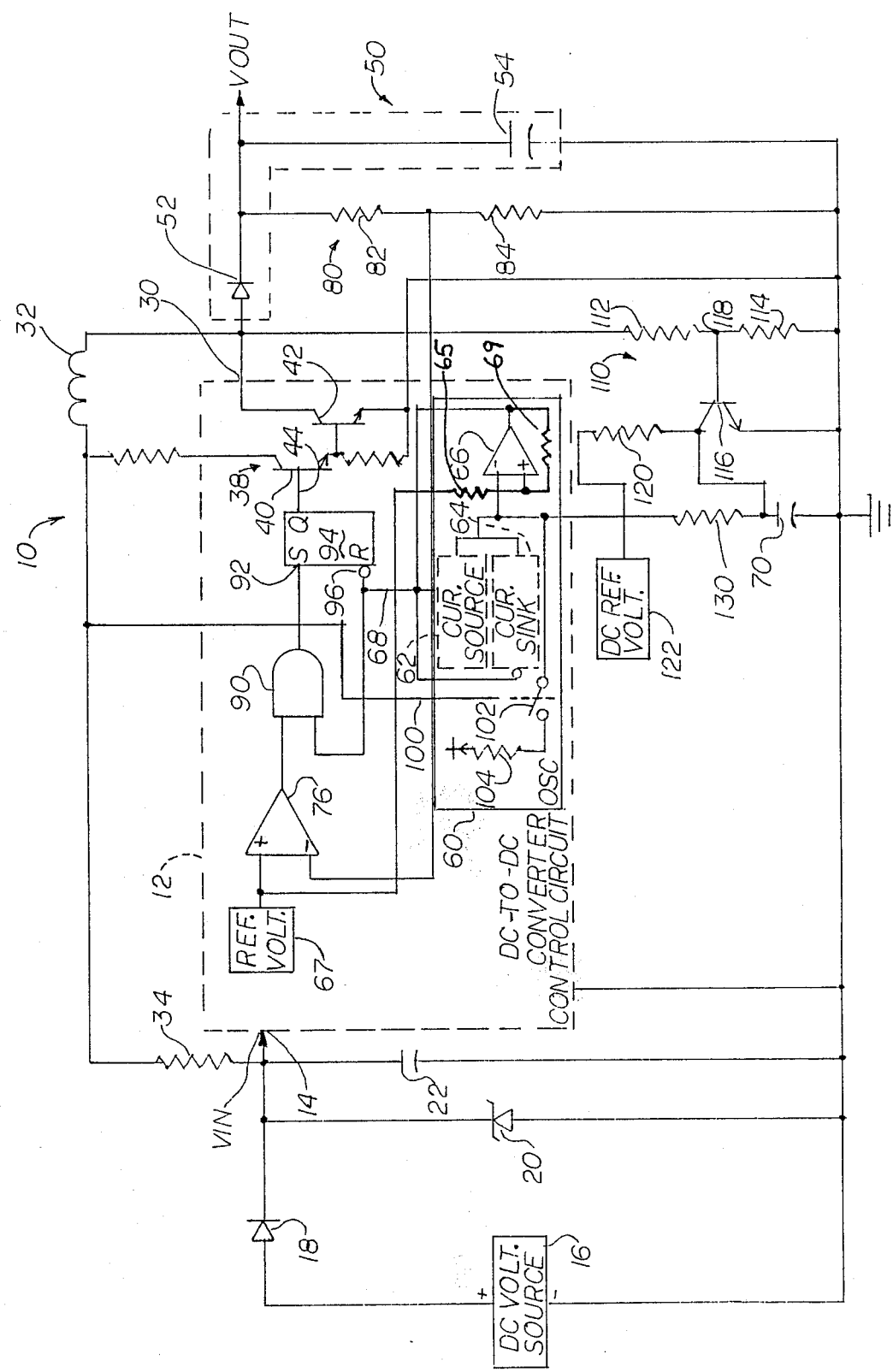

APPARATUS FOR EXTENDING THE VOUT/VIN RATIO OF A DC-TO-DC CONVERTER

This is a continuation of co-pending application Ser. No. 102,871, filed on Sept. 30, 1987, now abandoned.

BACKGROUND OF THE INVENTION

1. Technical Field

The present invention is directed to a DC-to-DC converter and is particularly directed to an apparatus for extending the Vout/Vin ratio of a commercially available DC-to-DC converter beyond the ratio limit specified by the original equipment manufacture.

2. Background Art

DC-to-DC converters are commercially available from several manufacturers. Such converters have a wide variety of applications in various arts and are particularly useful in the automotive art to generate a DC voltage level substantially greater than the voltage level provided by the vehicle battery. Not only does the converter provide an increased voltage level, but also regulates the converted voltage at that level.

One particular application of DC-to-DC converters in the automotive art is in the area of air bag diagnostic circuits. Such circuits use DC voltage levels substantially greater than the voltage level provided by the vehicle battery to perform specific diagnostic tests on system components. Some commercially available DC-to-DC converters have not proven adequate to provide and maintain a sufficient DC voltage level over the expected range of voltage levels provided by the vehicle battery. It is therefore desirable to extend the Vout/Vin ratio of a commercially available DC-to-DC converter beyond that specified by the manufacturer for such automotive applications.

Motorola Semiconductor Products Inc. manufactures a monolithic switching regulator subsystem intended for use as a DC-to-DC converter. This converter is commercially available under part number MC34063 ("the '063 converter"). The '063 converter includes an input for connection of a first DC voltage level, defined as Vin. An inductor is connected to the first DC voltage level through a current limiting resistor. A diode rectifier has its anode connected to the other side of the inductor. A filter capacitor is connected to the cathode of the diode rectifier and to electrical ground. The charge across the filter capacitor is defined as Vout.

The converter further includes an oscillator having a current source and a current sink. A timing capacitor is connected to the oscillator's current source and current sink. The oscillator outputs a control signal which is used to control actuation of a first switching device. The first switching device is connected to the junction of the inductor and diode rectifier and to electrical ground. The charging rate and the discharging rate of the timing capacitor respectively controls the ON and OFF time of the outputted oscillator control signal and, in turn, the ON and OFF time of the switching device.

When the switching device is ON, energy is stored in the inductor. When the switching device is switched OFF, energy, in the form of a voltage level, stored in the inductor is added to the Vin voltage value. The resultant output voltage after rectification and filtering, i.e., Vout, is greater than the Vin voltage. The Vout voltage value is a function of the ON vs. OFF time of the switching device, which is, in turn, a function of the ON vs. OFF time of the control signal outputted from the oscillator. The ON vs. OFF time of the oscillator control signal is functionally related to the charging rate and the discharging rate of the timing capacitor which is controlled by the oscillator's current source rating and the current sink rating. The manufacturer's specification for the '063 device limits the ON/(ON + OFF) ratio of the switching device to 0.857 for a typical current source rating of 35 microamps and a typical current sink rating of 200 microamps. This limits the Vout/Vin ratio to 6:1.

A Motorola application note AN920A suggests a circuit for extending the ON/(ON + OFF) ratio of the switching device to increase the Vout/Vin ratio. This suggested circuit includes a diode connected in series between the oscillator and the timing capacitor. The cathode of the diode connected to the timing capacitor. A PNP transistor has its base connected to the anode of the diode, its emitter connected to the cathode of the diode, and its collector connected to electrical ground. The suggested circuit does extend the operating ratio of the converter beyond that originally specified by the manufacturer. The particular arrangement, however, requires germanium components because of voltage values required for proper operation of the internal oscillator. As is well known in the art, germanium components are temperature sensitive and are expensive compared to silicon based devices.

Another problem with some commercially available DC-to-DC converters is that the converter's oscillator frequency is subject to substantial operating variations. This results from a loose tolerances of the oscillator's current source rating and current sink rating. To optimize core volume of the inductor, it is desirable to have a stabilized oscillator frequency at a known value.

SUMMARY OF THE INVENTION

The present invention is directed to an apparatus for extending the Vout/Vin ratio of a commerically available DC-to-DC converter. The present invention is further directed to an apparatus for stabilizing the oscillator frequency of a commerically available DC-to-DC converter.

In accordance with the present invention, an apparatus for converting a first DC voltage to a second DC voltage is provided wherein the value of the second DC voltage is greater than the first DC voltage. The apparatus comprises an inductor connected to the first DC voltage and rectifier means having an input connected to the other side of the inductor, the output of the rectifier means defining the second DC voltage. The apparatus further includes first switching means actuatable in response to a first control signal for connecting the junction of the inductor and the rectifier means to an electrical potential having a value less than the first DC voltage. The apparatus further includes oscillator means connected to the switching means for providing the first control signal, the first control signal having a duty cycle. A timing capacitor is provided connected to the oscillator means. The oscillator means includes current source means for charging the capacitor at a rate and a current sink means for discharging the timing capacitor at a rate, the charging rate and the discharging rate establishing the duty cycle of the first control signal provided by the oscillator means. The apparatus further includes second switching means connected to the timing capacitor and actuatable in response to a second control signal for discharging the timing capacitor at a rate faster than the discharging rate through the current sink means and means connected to the junction of the inductor and rectifier means for providing the second control signal in response to a predetermined voltage level at the junction.

In accordance with a preferred embodiment of the present invention, the DC-to-DC converter includes an oscillator and a first switching circuit connected to the oscillator. An inductor is connected between the first DC voltage level and a rectifier circuit. A timing capacitor is connected to the oscillator and controls the frequency of the oscillator output signal. The oscillator output signal is connected to the first switching circuit and controls actuation thereof. The rectifier circuit includes a diode and filter capacitor. The charge developed across the filter capacitor is the second DC voltage. A resistor dividing network connected to the junction of the inductor and rectifier circuit and to electrical ground. A second switching circuit is connected to the voltage dividing network and is connected across the timing capacitor and adapted to provide a second discharge path for the timing capacitor when the voltage at the junction of the inductor and the rectifier circuit reaches a predetermined level as sensed through the voltage dividing network.

In accordance with another embodiment of the present invention, the second switching circuit includes a solid state switching device having a control input connected to the timing capacitor, one input connected to the voltage dividing network, and a second input connected to electrical ground. A pull-up resistor is connected to one input of the solid state switching device and to a DC reference voltage so as to provide a second charging path for the timing capacitor. The second charging path stabilizes the operating frequency of the oscillator by "swamping out" the charging effect of the oscillator's current source which is subject to wide tolerance variations.

In accordance with yet another embodiment of the present invention, an overcurrent compensating resistor is placed in series between the oscillator of the converter and the timing capacitor when the secondary switching circuit with the pull-up resistor is used. The use of the pull-up resistor to stabilize the oscillator frequency requires an increase in the value of the timing capacitor. When a large value timing capacitor is used, a significant delay is introduced for an overcurrent shutdown of the converter. A current limiting resistor is connected in series with an inductor. The oscillator monitors the voltage drop across the current limiting resistor. The voltage drop across the current limiting resistor reaching a predetermined value is indicative an overcurrent condition. When the oscillator senses an overcurrent condition, it closes an internal switching device to provide a secondary current source, through a pull-up resistor, to try and quickly charge the timing capacitor and turn OFF the first switching device. However, because of the increased value of the timing capacitor, a long delay time is necessary to charge the timing capacitor and turn OFF the first switching device. By introducing the overcurrent compensating resistor in series with the timing capacitor, a voltage divider is introduced between the oscillator's pull-up resistor, connected by closure of the internal switching device, and the overcurrent compensating resistor. The junction between the internal pull-up resistor and the current compensating resistor is connected to an inverting input of a comparator. A reference voltage is connected to the comparator's noninverting input through a resistor. The output of the comparator is connected back to the noninverting input through a resistor. The comparator output is used to control the first switching device. When the internal switch is closed, the voltage divider raises the voltage level at the inverting input of the comparator to a value greater than the value of the reference voltage connected to the noninverting input of the comparator. This results in the comparator switching OFF the first switching device. The overcurrent compensating resistor in this embodiment has no effect on the ratio extending discharging rate of the timing capacitor through the second switching device.

BRIEF DESCRIPTION OF THE DRAWING

Further features and advantages of the present invention will become apparent to those skilled in the art to which the present invention relates from a reading of the following specification made with reference to the accompanying drawing which shows a schematic block diagram of an apparatus for extending the Vout/Vin ratio of a DC-to-DC converter in accordance with the present invention.

DESCRIPTION OF A PREFERRED EMBODIMENT

Referring to the FIGURE, an apparatus 10 is shown for extending the Vout/Vin ratio of a commercially available converter control circuit 12 beyond the ratio specified by the original equipment manufacturer. The converter control circuit 12 includes an input 14. A DC voltage source 16 is connected to the input 14 through a diode 18. A Zener diode 20 is connected between the input 14 and electrical ground and is used to limit the input voltage to a predetermined value. Capacitor 22 is connected between the input 14 and electrical ground for the purpose of suppressing any electrical noise that may be present on the input voltage signal. The voltage level at the input 14 is defined as Vin. The Vin voltage provides all internal operating power for the remainder of the converter control circuit 12.

The converter control circuit 12 further includes an output 30. An inductor 32 is electrically connected to the output 30 and is also connected to the input 14 through a current limiting resistor 34. A first switching circuit 38 includes Darlington transistors 40, 42. The transistor 42 has its collector connected to the output 30 and its emitter connected to electrical ground. The actuation of the transistor 40, and in turn, actuation of transistor 42 is responsive to a control signal 44 connected to the base of the transistor 40. A recitifier circuit 50, which includes a diode 52 and a filter capacitor 54, is connected to the output 30 of the converter control circuit 12. The voltage developed across the capacitor 54 is defined as Vout.

The converter control circuit 12 further includes an internal oscillator 60 having a current source 62 and a current sink 64 associated therewith. The current source 62 and the current sink 64 are connected to the inverting input of a comparator 66. The noninverting input of the comparator 66 is connected to a DC reference voltage 67 through resistor 65. The output 68 of the comparator 66 is electrically connected back to the noninverting input through a resistor 69. The comparator output 68 is an electrical signal having a set duty cycle. A timing capacitor 70 is electrically connected to the current source 62 and the current sink 64 of the oscillator 60. The duty cycle of the output signal 68 is controlled by the charging rate and discharging rate of the capacitor 70. The output 68 of comparator 66 is further connected to the current source 62 and the current sink 64 for control thereof. The converter control circuit 12 further includes a comparator 76 having its noninverting input connected to the reference voltage 67 and its inverting input connected to the Vout voltage through a voltage dividing network 80. The voltage dividing network 80 includes a first resistor 82 and a second resistor 84 electrically connected in series between Vout and electrical ground. The voltage dividing network 80 functions as a feedback signal to the converter control circuit 12 and is used to control the value of the output voltage Vout. The nominal output voltage Vout is determined by the values of the resistors 82, 84.

The output of the comparator 76 is connected to an AND gate 90. The output 68 of the oscillator 60 is connected to the second input of AND gate 90. The output of the AND gate 90 is connected to the SET input 92 of an RS flip-flop 94. The output 68 of the oscillator 60 is connected to the RESET input 96 of the RS flip-flop 94. The output 44 of the RS flip-flop 94 is connected to the base of transistor 40 and controls actuation thereof.

The current source 62 and the current sink 64 of the oscillator 60 respectively charge and discharge the timing capacitor 70 between predetermined upper and lower voltage levels. The specification for the Motorola MC34063 indicates the current source 62 typically provides 35 microamps charging current and current sink 64 typically draws 200 microamps of current. This yields a typical ramp up to ramp down (charging to discharging) ratio of 6:1. The oscillator runs continuously with the ON and OFF times depending upon the charging rate and the discharging rate of the timing capacitor 70.

Assume the output of comparator 66 is a digital LOW which enables the current sink 64. The reference voltage 67 establishes a first predetermined threshold voltage value at the noninverting input of comparator 66 through resistors 65, 69. When the timing capacitor 70 is discharged below the first predetermined threshold voltage value, the voltage at the noninverting input of the comparator 66 is greater than the voltage at the inverting input. Therefore, the output of comparator 66 switches to a digital HIGH. A digital HIGH at the output 68 of the oscillator 60 enables the current source 62 which begins a voltage ramp up of the timing capacitor 70. The digital HIGH from the output of comparator 66 establishes a second predetermined threshold voltage value at its noninverting input through resistor 69. The second predetermined voltage value is greater than the first predetermined voltage value. The digital HIGH from the output of the oscillator 60 also switches the output of the AND gate 90 to a digital HIGH which sets the RS flip-flop driving its output HIGH which, in turn, turns ON both transistors 40, 42. When transistor 42 is ON, energy is being stored in the inductor 32. Once the charge on timing capacitor 70 exceeds the second predetermined voltage value, the output of comparator 66 of the oscillator 60 is switched to a digital LOW which enables the current sink 64 and resets the RS flip-flop 94. Resetting flip-flop 94 turns OFF transistor 40 and, in turn, turns OFF transistor 42. When the output of comparator 66 switches LOW, the noninverting voltage value switches back to the first predetermined voltage value.

The comparator 76 is used to control the OFF time of transistor 42 by controlling when the RS flip-flop 94 is to be set. When the output of comparator 66 is HIGH, a voltage ramp up of the timing capacitor 70 occurs. The output of AND gate 90 will not switch HIGH to set the flip-flop 94 until the output of comparator 76 is switched HIGH. If the voltage sensed at the inverting input of the comparator 76 is greater than the reference voltage value 67, the comparator 76 outputs a digital LOW thereby preventing the output of AND gate 90 from switching HIGH. Such a condition indicates the Vout voltage is greater than desired. When the Vout voltage drops slightly below the value selected by resistors 82, 84, the inverting input voltage of comparator 76 falls below the value of the reference voltage 67 which causes the output of comparator 76 to switch to a HIGH.

The oscillator 60 further includes a current sensing input 100 operatively connected to the junction of resistor 34 and inductor 32. An internal switch 102 is operatively connected to the inverting input of the comparator 66 and to a pull-up resistor 104. The pull-up resistor 104 is connected to a predetermined DC voltage level. The voltage drop across the resistor 34 is monitored by the oscillator 60. If the voltage across the current limiting resistor 34 is greater than a predetermined value, the oscillator 60 closes the switch 102 to thereby provide an additional current path to charge the timing capacitor 70. The additional current path shortens the ramp up time of the timing capacitor 70 so as to quickly turn OFF transistor 42.

A voltage dividing network 110, including resistor 112 and resistor 114, is connected in series between the output 30 of the converter control circuit 12 and electrical ground. An NPN transistor 116 has its base connected to the junction 118 of resistors 112, 114, its emitter connected to electrical ground and its collector connected to the capacitor 70. The purpose of the transistor 116 is to provide a rapid discharge of the timing capacitor 70 so as to extend the ON/(ON + OFF) time of the transistor 42 thereby increasing the Vout/Vin ratio.

When the transistor 42 is ON, energy is stored in the inductor 32. When the transistor 42 turns OFF, the energy stored in the inductor 32 creates a voltage at the output 30 of the inverter 12. The voltage across the inductor 32 is added to the voltage value Vin which, in turn, develops a voltage across the capacitor 54 (Vout) equal to Vin(ON/OFF) + Vin. As discussed above, the comparator 76 monitors the output voltage Vout and adjusts the OFF time of the RS flip-flop 94 and, in turn, transistor 42 to control the voltage level of Vout. The specification of the '063 device limits the ratio of ON/(ON + OFF) of the transistor 42 to 0.857. The OFF time is decreased by use of the transistor 116 which increases the ratio of ON/(ON + OFF). With this arrangement, the Vout/Vin ratio is increased beyond that specified by the manufacturer when only the oscillator's current sink 64 is used to discharge the timing capacitor 70.

In accordance with another embodiment of the present invention, a resistor 120 is operatively connected to the collector of the transistor 116 and to a DC reference voltage 122. The purpose of the resistor 120 is to stabilize the operating frequency of the oscillator 60. Manufacturer's tolerances on the current source and current sink are quite (varied) loose resulting in a wide range of operating frequencies. Since the transistor 116 discharges the timing capacitor 70, the effect of variations in the current sink 64 are negligible. Charging of the capacitor 70 is accomplished in this embodiment by the voltage reference 122 through resistor 120. The value of the resistor 120 is selected so the current flow through resistor 120 will "swamp out" the effect of the current flow from the current source 62 of the oscillator 60. Also, variations in the current source 62 are negligible for a determination of the oscillator's frequency. Thus, variations in the switch frequency are controllably maintained with a tighter tolerance than is provided through the current source 62 and current sink 64 of the oscillator 60.

In accordance with yet another embodiment of the present invention, a resistor 130 is operatively connected in series between the oscillator 60 and the timing capacitor 70. When capacitor charging is accomplished using the DC reference voltage 122 through resistor 120, a larger value must be selected for timing capacitor 70. Such larger value of the timing capacitor 70 would cause a time delay in operation of the overcurrent shutdown circuit described above. The resistor 130 is used to compensate for an increase in the timing capacitor value and thereby prevent any delay in the overcurrent shutdown circuit. When an overcurrent condition is sensed on input 100, switch 102 is closed and current flows through the pull-up resistor 104 and resistor 130 to the timing capacitor 70 to quickly charge the timing capacitor and thereby turn OFF the transistor 42. The current compensating resistor 130 in series with the timing capacitor 70 and pull-up resistor 104 introduces a voltage at the inverting input of comparator 66 with respect to the reference voltage 67 at the noninverting input of comparator 66 resulting in a rapid turn OFF of the switching device 42.

From the above description of preferred embodiments of the invention, those skilled in the art will appreciate that the invention improves upon the operation of an integrated DC-to-DC converter control circuit so as to permit their use in applications where they would not be otherwise suitable. While up converters using discrete components can provide large Vout/Vin ratios, such designs use a significant amount of parts and take up a significant amount of physical space on a circuit board. It is clearly desirable to use an integrated circuit so as to reduce the number of parts, cost, and space required to carry out the conversion function. Such integrated converters have not provided the Vout/Vin ratios that can be achieved with a completely discrete system. The present invention improves the operation of such integrated circuits beyond the manufacturer's specification. Those skilled in the art will perceive improvements, changes and modifications. Such improvements, changes and modifications within the skill of the art are intended to be covered by the appended claims.

Having described a preferred embodiment of the invention, I claim:

1. An apparatus for converting a first DC voltage to a second DC voltage, the value of the second DC voltage being greater than the first DC voltage, said apparatus comprising:
   an inductor connected to the first DC voltage;
   rectifier means having an input connected to the other terminal of the inductor, the output of the rectifier means defining the second DC voltage;
   first switching means actuatable in response to a first control signal for connecting the junction of said inductor and said rectifier means to an electrical potential having a value less than the first DC voltage;
   oscillator means connected to said switching means for providing said first control signal, said first control signal having a duty cycle;
   a timing capacitor connected to said oscillator means;
   said oscillator means including current source means for charging said timing capacitor at a rate and a current sink means for discharging said timing capacitor at a rate, the charging rate and the discharging rate establishing the duty cycle of said first control signal provided by said oscillator means;
   second switching means connected to said timing capacitor and actuatable in response to a second control signal for discharging said timing capacitor at a rate faster than the discharging rate through said current sink means; and
   means connected to the junction of said inductor and said rectifier means for providing said second control signal in response to a predetermined voltage level at said junction.

2. The apparatus of claim 1 wherein said means for providing said second control signal includes a resistor voltage dividing network connected between the junction of said inductor and said rectifier means and electrical ground and wherein said second switching means includes a solid state switching device having a control input connected to said resistor voltage dividing network, one input connected to said timing capacitor, and a second input connected to electrical ground, said solid state switching device turning ON in response to a predetermined voltage level at the junction of said inductor and said rectifier means.

3. The apparatus of claim 2 wherein said solid state switching device is an NPN transistor having its base connected to the resistor voltage dividing network, its collector connected to said timing capacitor, and its emitter connected to electrical ground.

4. The apparatus of claim 2 further including a pull-up resistor connected to the one input of said solid state switching device and to a DC reference voltage so as to provide a secondary current source for charging of the timing capacitor, the secondary current source being of sufficient value so as to make negligible the charging effect of said current source means of the oscillator.

5. An apparatus for extending the Vout/Vin ratio of a DC-to-DC converter including an integrated circuit having an input for connection of a first DC voltage, the first DC voltage being Vin, the converter further including an external inductor connected between the input and an external rectifier circuit, the rectifier circuit providing a second DC voltage, the second DC voltage being Vout, an internal first actuatable switching circuit connected to the junction of the inductor and rectifier circuit and to electrical ground and responsive to a first actuation signal for selectably switching the field of the inductor ON and OFF, an internal oscillator having its output connected to the first actuatable switching circuit for providing the first actuation signal, the first actuation signal having a duty cycle, an external timing capacitor connected to the oscillator, the oscillator having an internal current source for charging the timing capacitor and an internal current sink for discharging the timing capacitor, the charging time and discharging time controlling the duty cycle of actuation signal output by the oscillator, the improvement comprising:

a second actuatable external switching circuit connected to the timing capacitor and electrical ground and actuatable in response to a second actuation signal for, when actuated, providing a second discharge path for the timing capacitor; and external means connected to the output of the converter for providing said second actuation signal to the second switching circuit means in response to the converter output voltage reaching a predetermined value.

6. The apparatus of claim 5 wherein said external means for providing said second control signal includes an external resistor voltage dividing network connected between the junction of said inductor and said rectifier means and electrical ground and wherein said second actuatable switching circuit includes an external solid state switching device having a control input connected to said resistor voltage dividing network, one input connected to the timing capacitor, and a second input connected to electrical ground, said solid state switching device turning ON in response to a voltage level at the junction of said inductor and said rectifier means being at a predetermined voltage value.

7. The apparatus of claim 6 wherein said solid state switching device is an NPN transistor having its base connected to the resistor voltage dividing network, its collector connected to the timing capacitor and its emitter connected to electrical ground.

8. The apparatus of claim 6 further including an external pull-up resistor connected to the one input of said solid state switching device and to a DC reference voltage so as to provide a secondary current source for charging of the timing capacitor, the secondary current source being of sufficient value so as to make the charging effect of said current source of the oscillator negligible.

9. An apparatus for converting a first DC voltage to a second DC voltage, the value of the second DC voltage being greater than the first DC voltage, said apparatus comprising:

an inductor connected to the first DC voltage;

rectifier means having an input connected to the other terminal of the inductor, the output of the rectifier means defining the second DC voltage;

first switching means actuatable in response to a first control signal for connecting the junction of said inductor and said rectifier means to an electrical potential having a value less than the first DC voltage;

oscillator means connected to said switching means for providing said first control signal, said first control signal having a duty cycle;

a timing capacitor connected to said oscillator means;

said oscillator means including current source means for charging said timing capacitor at a rate and a current sink means for discharging said timing capacitor at a rate, the charging rate and the discharging rate establishing the duty cycle of said first control signal provided by said oscillator means;

second switching means connected to said timing capacitor and actuatable in response to a second control signal for discharging said timing capacitor at a rate faster than the discharging rate through said current sink means; and means connected to the junction of said inductor and said rectifier means for providing said second control signal in response to said first switching means disconnecting the junction of said inductor and said rectifier means from the electrical potential.

10. An apparatus for extending the Vout/Vin ratio of a DC-to-DC converter having an input for connection of a first DC voltage, the first DC voltage being Vin, the converter further including an inductor connected between the input and a rectifier circuit, the rectifier circuit providing a second DC voltage, the second DC voltage being Vout, a first actuatable switching circuit connected to the junction of the inductor and rectifier circuit and to electrical ground and responsive to a first actuation signal for selectably switching the field of the inductor ON and OFF, an oscillator having its output connected to the first actuatable switching circuit for providing the first actuation signal, the first actuation signal having a duty cycle, a timing capacitor connected to the oscillator, the oscillator having a current source for charging the timing capacitor and a current sink for discharging the timing capacitor, the charging time and discharging time controlling the duty cycle of actuation signal output by the oscillator, the improvement comprising:

a second actuatable switching circuit connected to the timing capacitor and electrical ground and actuatable in response to a second actuation signal for, when actuated, providing a second discharge path for the timing capacitor; and means connected to the output of the converter for providing said second actuation signal to the switching circuit means in response to the first switching means disconnecting the junction of the inductor and the rectifier means from the electrical potential.

11. An apparatus for converting a first DC voltage to a second DC voltage, the value of the second DC voltage being greater than the first DC voltage, said apparatus comprising:

an inductor connected to the first DC voltage through a current sensing resistor;

rectifier means having an input connected to the other terminal of the inductor, the output of the rectifier means defining the second DC voltage;

first switching means actuatable in response to a first control signal for connecting the junction of said inductor and said rectifier means to an electrical potential having a value less than the first DC voltage;

a timing capacitor;

oscillator means including,
a comparator for providing said first control signal in response to voltage values at its inverting and noninverting inputs, and current source means for charging said timing capacitor at a rate and current sink means for discharging said timing capacitor at a rate, the charging rate and the discharging rate establishing the duty cycle of said first control signal provided by said oscillator means, said current source means and said current sink means connected to the inverting input of said comparator and to said timing capacitor through a current compensating resistor, a voltage reference connected to the noninverting input of the comparator;

second switching means connected to said timing capacitor and actuatable in response to a second control signal for discharging said timing capacitor at a rate faster than the discharging rate through said current sink means;

means connected to the junction of said inductor and said rectifier means for providing said second control signal in response to the first switching means disconnecting the junction of said inductor and rectifier means from the electrical potential;

means for providing a secondary charging circuit for said timing capacitor when said second switching means is not actuated, said second charging circuit providing a charging current of sufficient magnitude to make negligible the charging effect of the current source means of the oscillator means; and actuatable switch means, responsive to the voltage across the current sensing resistor, for providing a third charging circuit, through a pull-up resistor, for said timing capacitor through said current compensating resistor when the voltage across the current sensing resistor exceeds a predetermined value, the pull-up resistor and said current compensating resistor forming a voltage dividing network, the junction therebetween being connected to the inverting input of the comparator, the pull-up resistor and the current compensating resistor adapted to cause the comparator of the oscillator means to provide said first control signal when said actuatable switch means

\* \* \* \* \*

UNITED STATES PATENT AND TRADEMARK OFFICE
CERTIFICATE OF CORRECTION

PATENT NO. : 4,814,684

DATED : March 21, 1989

INVENTOR(S) : Roger A. McCurdy

It is certified that error appears in the above-identified patent and that said Letters Patent is hereby corrected as shown below:

Column 12, Line 12 add "is actuated." after the word "means"

Signed and Sealed this

Eighteenth Day of July, 1989

Attest:

DONALD J. QUIGG

Attesting Officer

Commissioner of Patents and Trademarks